(12) United States Patent
Li et al.

(10) Patent No.: US 7,142,431 B2
(45) Date of Patent: Nov. 28, 2006

(54) COMPUTER ENCLOSURE

(75) Inventors: Ding-Fang Li, Shenzhen (CN);
Xiao-Zhong Jing, Shenzhen (CN);
Yang-Ming Lin, Shenzhen (CN)

(73) Assignees: Hong Fu Jin Precision Industry (Shenzhen) Co., Ltd., Guangdong Province; Hon Hai Precision Industry Co., Ltd. (TW)

( * ) Notice: Subject to any disclaimer, the term of this patent is extended or adjusted under 35 U.S.C. 154(b) by 0 days.

(21) Appl. No.: 11/107,257

(22) Filed: Apr. 15, 2005

(65) Prior Publication Data
US 2005/0237706 A1    Oct. 27, 2005

(30) Foreign Application Priority Data
Apr. 24, 2004    (CN) .................. 2004 2 0045419

(51) Int. Cl.
  H05K 7/16    (2006.01)
  H05K 5/00    (2006.01)
  A47B 81/00   (2006.01)
  E05C 19/00   (2006.01)
(52) U.S. Cl. .................. 361/726; 361/683; 312/223.1; 312/223.2; 292/302
(58) Field of Classification Search ................ 361/726, 361/683
See application file for complete search history.

(56) References Cited

U.S. PATENT DOCUMENTS 5,825,626 A * 10/1998 Hulick et al. ............... 361/724
5,975,659 A * 11/1999 Yang et al. ............... 312/223.2
6,053,586 A *  4/2000 Cook et al. ............... 312/223.2
6,157,532 A * 12/2000 Cook et al. ................. 361/681
6,257,682 B1 *  7/2001 Liu et al. .................. 312/223.2
6,354,680 B1 *  3/2002 Lin et al. .................. 312/223.2
6,375,287 B1 *  4/2002 Lai .......................... 312/223.2
6,542,356 B1 *  4/2003 Gan ........................... 361/683
6,816,391 B1 * 11/2004 Davis et al. ................. 361/818
6,932,447 B1 *  8/2005 Chen et al. ............... 312/223.2

FOREIGN PATENT DOCUMENTS

TW          386613          4/2000

\* cited by examiner

Primary Examiner—Lisa Lea-Edmonds
Assistant Examiner—Zachary Pape
(74) Attorney, Agent, or Firm—Morris Manning & Martin; Tim Tingkang Xia, Esq.

(57) ABSTRACT

A computer enclosure includes a computer chassis (10), a locking member (30) and a side panel (40). The computer chassis includes a front panel (12), a rear panel (14), a top panel (16) and a bottom panel (18). Two of the panels perpendicularly respectively extend and form two flanges. The locking member is pivotally attached to one of the flanges of the computer chassis for movement between an open position and a closed position. A resilient member (50) is arranged between the side panel and the computer chassis. The resilient member includes an elastic portion (52). When the locking member is in the open position, the side panel turns around on the other one of the flanges via the elastic portion is pressed on said other one of the flanges.

3 Claims, 5 Drawing Sheets

COMPUTER ENCLOSURE

BACKGROUND OF THE INVENTION

1. Field of the Invention

The present invention relates to a computer enclosure, and in particularly to a computer enclosure having fastening devices for readily securing a side panel to the computer enclosure and readily detaching the side panel therefrom the case.

2. Background of the Invention

Many different means and devices are used to secure side panels to computer enclosures. One conventional means is to simply screw a side panel directly to a computer enclosure. However, this requires a screwdriver. Installation and removal of the side panel is unduly cumbersome and time-consuming.

As computers have proliferated and improved, various other fastening means have been developed to facilitate installation and removal of side panels. In accordance with one attempted solution for the above mentioned problem, a locking means includes a plurality of hooks is inwardly formed from a flange of one side of a side panel of a computer casing, for engaging within corresponding slots in a rear panel of the computer casing. An opposite side of the side panel forms an L-shaped flange. A plurality of apertures is defined in the L-shaped flange, for extension of screws thereinto. Because screws are needed to fix the side panel to the computer casing, installation and removal of the side panel is still unduly cumbersome and time-consuming.

Another conventional arrangement, a side panel fastened to a computer includes an access door mounted to the chassis, the access door is suitable for permitting access to an electronic component contained in the computer chassis. A release mechanism is adjacent to the access door and forms a cylindrical locking rod, and the locking rod has two notched portions to retain clips from the access door. When the access door is released from the computer chassis, the access door may still stay in a lock position without leaving the computer chassis for locking tightly, so sometimes a user has to remove the access door from the chassis by force.

An improved fastening device for securing a side panel to a computer enclosure which overcomes the above-mentioned problems is desired.

SUMMARY

Accordingly, what is needed is of the preferred embodiment is to provide a computer enclosure for readily and securely installing and removing side panel from a chassis of a computer.

To achieve the end, a computer enclosure includes a computer chassis, a locking member and a side panel. The computer chassis includes a front panel, a rear panel, a top panel and a bottom panel. Two of the panels perpendicularly respectively extend and form two flanges. The locking member is pivotally attached to one of the flanges of the computer chassis for movement between an open position and a closed position. A resilient member is arranged between the side panel and the computer chassis. The resilient member includes an elastic portion. When the locking member is in the open position, the side panel turns around on the other one of the flanges via the elastic portion is pressed on said other one of the flanges.

A principal advantage of this embodiment is that the side panel can be taken off easily and can make the installation quicker and easier.

Other objects, advantages and novel features of the present invention will become more apparent from the following detailed description when taken in conjunction with the accompanying drawings, in which:

DETAIL DESCRIPTION OF PREFERRED EMBODIMENT

Figure 1:
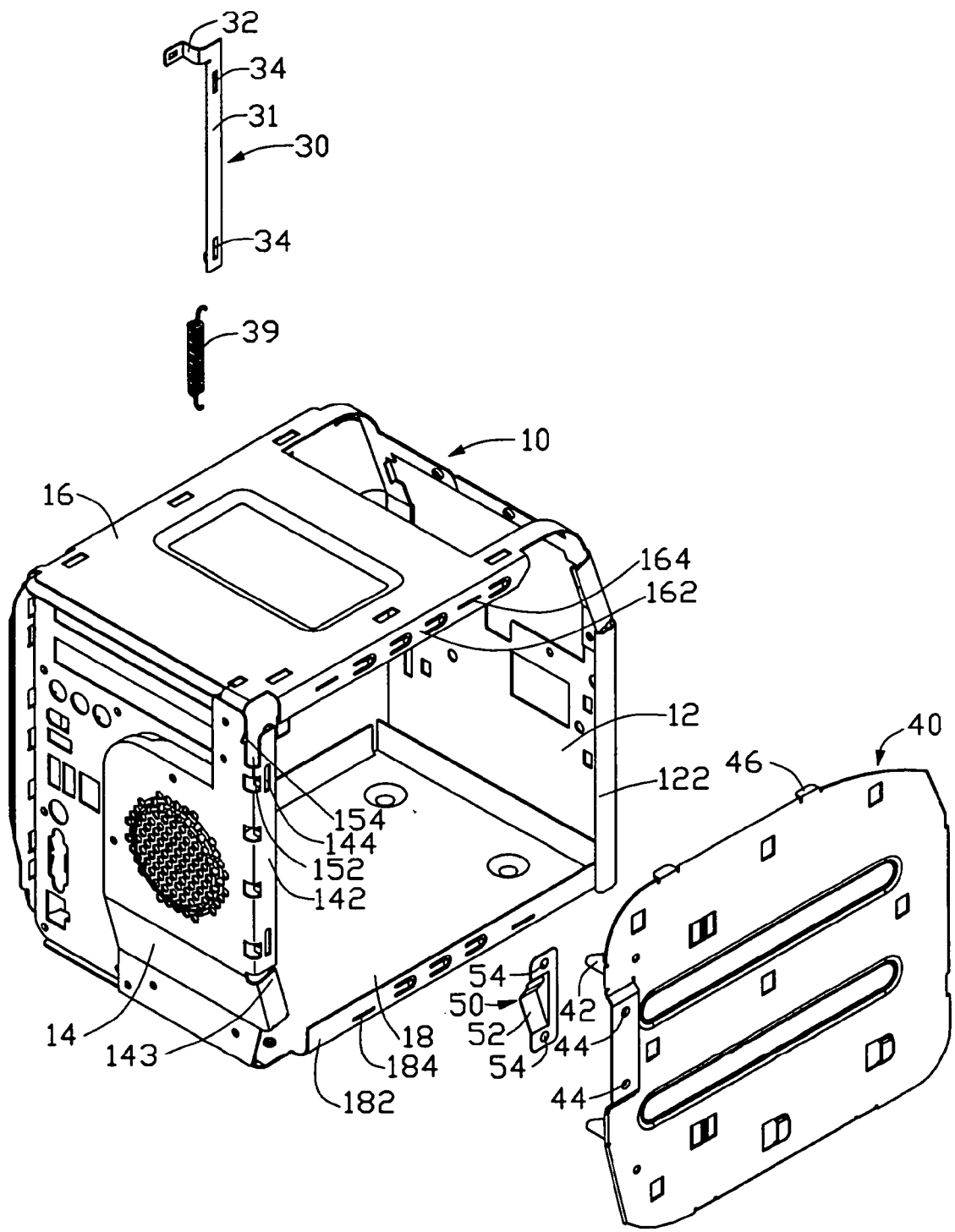
FIG. 1 is an exploded, isometric view of a computer enclosure in accordance with the preferred embodiment of the present invention, together with a locking member and a side panel.
Figure 2:
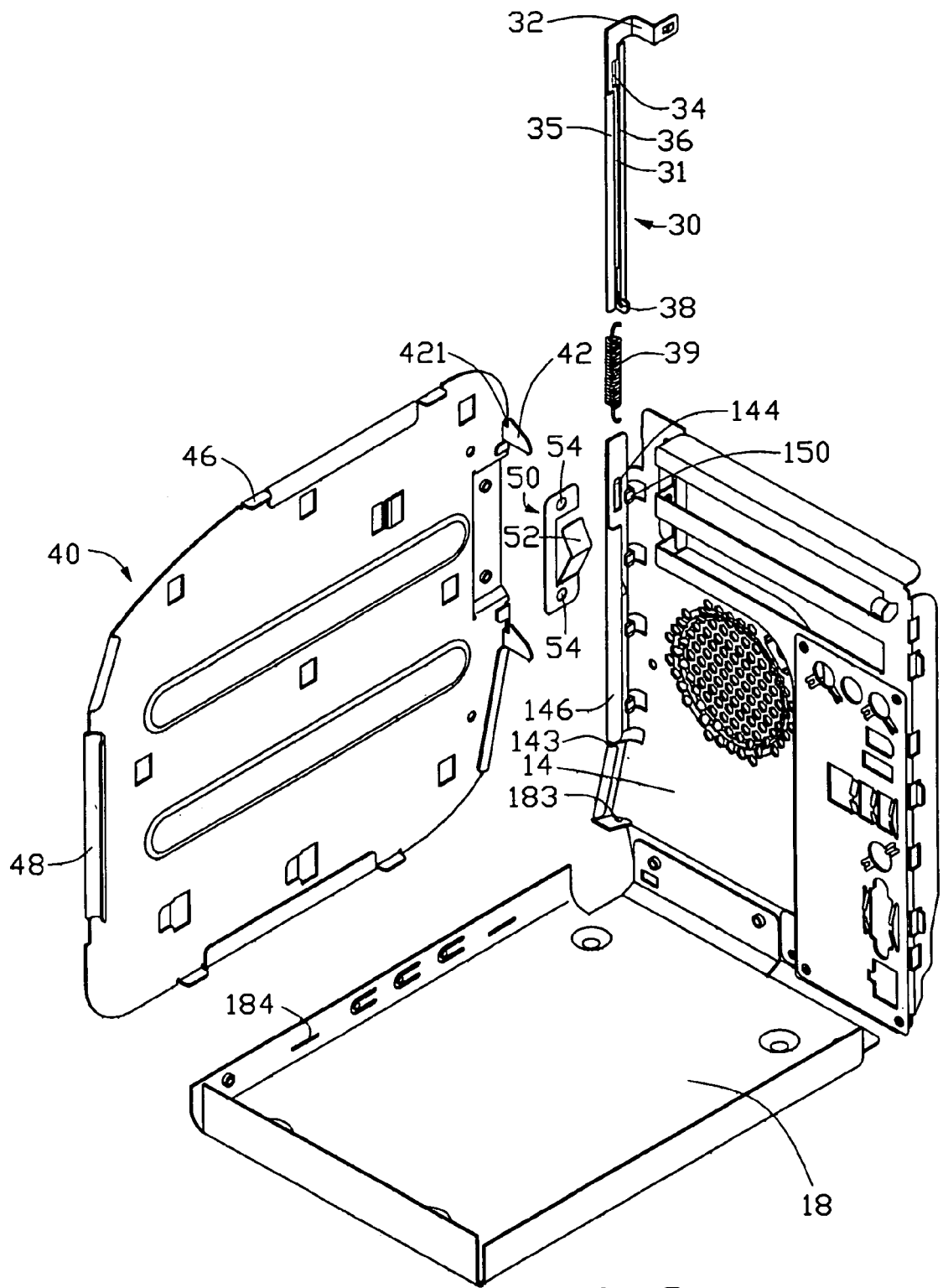
FIG. 2 is an exploded view of the computer enclosure of FIG. 1 but viewed from another aspect.

Referring to FIGS. 1 to 2, an electronic device like a computer having an enclosure in accordance with the preferred embodiment of the present invention includes a computer chassis 10, a locking member 30, a side panel 40 attached to the computer chassis 10 via the locking member 30, and a resilient member 50.

The computer chassis 10 includes a front panel 12, a rear panel 14, a top panel 16 and a bottom panel 18. The front panel 12, the rear panel 14, the top panel 16 and the bottom panel 18 together around define an opening (not labeled). The front panel 12, the rear panel 14, the top panel 16 and the bottom panel 18 perpendicularly extend inwardly from the edge of the opening to form a first flange 122, a second flange 142, a third flange 162 and a fourth flange 182, respectively. Anyone of the four flanges can perform the same function of the present invention, and the second flange 142 is preferred in the present invention. A slot (not labeled) divides the flange 142 into two parts in a lower position, a higher part of the flange 142 defines a pair of notches 144 and a lower part of the flange 142 is further bent inwardly to form a stopper 143, a first hook 183 extends from the bottom end of the stopper. The edge of the second flange 142 further perpendicularly extends inwardly to form a bent portion 146. A plurality of catches 150 is formed on the corner of the second flange 142 abutting on the rear panel 14. The bent portion 146 together with the catches 150 defines a sliding space (not labeled) therebetween. The top end of the corner of the second flange 142 defines an opening 152. A salient 154 extends outwardly from one edge of the opening 152 on the rear panel 14. The first flange 122 has an arc bent to form a pivot part. A plurality of first slits 164 and second slits 184 are formed on the third flange 164 and the fourth flange 184, respectively.

The locking member 30 includes a strip body 31, an operation part 32 extending perpendicularly from the top end of the strip body 31, a second hook 38 extending perpendicularly from the bottom end of the strip body 31 and a spring 39. Two brims 35, 36 are bent inwardly from opposite side edges of the strip body 31. A pair of clasp slots 34 is defined in the middle of the strip body 31.

The side panel 40 is used to cover the opening defined by the other panels of the computer chassis. Corresponding to the notches 144 on the second flange 142, one side edge of the side panel 40 forms a pair of clasps 42. Each clasp 42 protrudes a salient portion 421 on the upper border. A pair of screw holes 44 is defined in the side panel 40 between the clasps 42. On the upper edge and the lower edge of the side panel 40, a plurality of tabs 46 protrudes perpendicularly corresponding to the first slits 164 and the second slits 182. A rotating portion 48 is bent inwardly from the other side edge of the side panel 40.

The resilient member 50 is a slice body with a V-shaped cantilevered portion 52 in the middle. A pair of fixing holes 54 corresponding to the screw holes 44 is defined in the resilient member 50.

Figure 3:
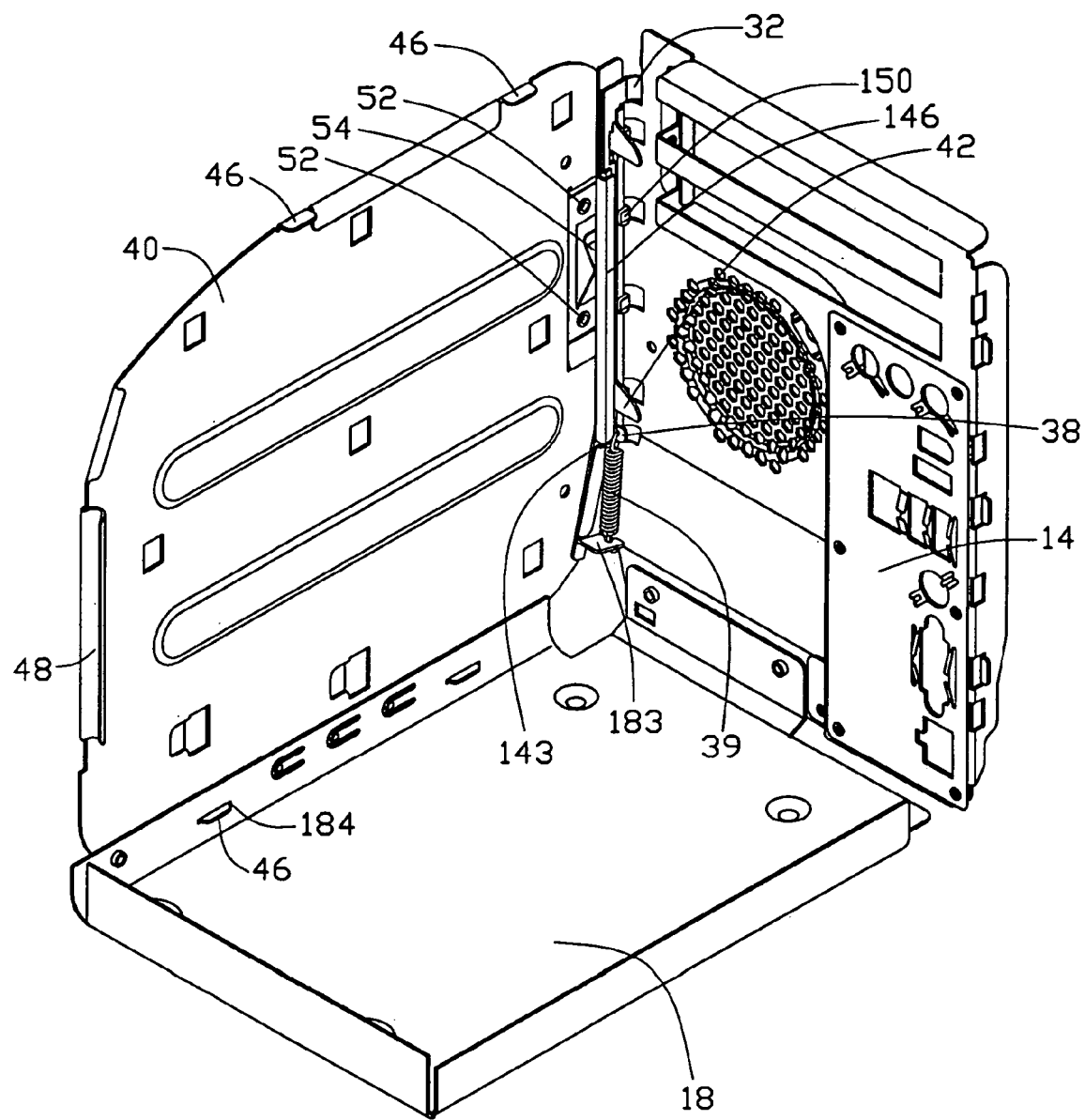
FIG. 3 is an assembled view of the computer enclosure of FIG. 1.
Figure 4:
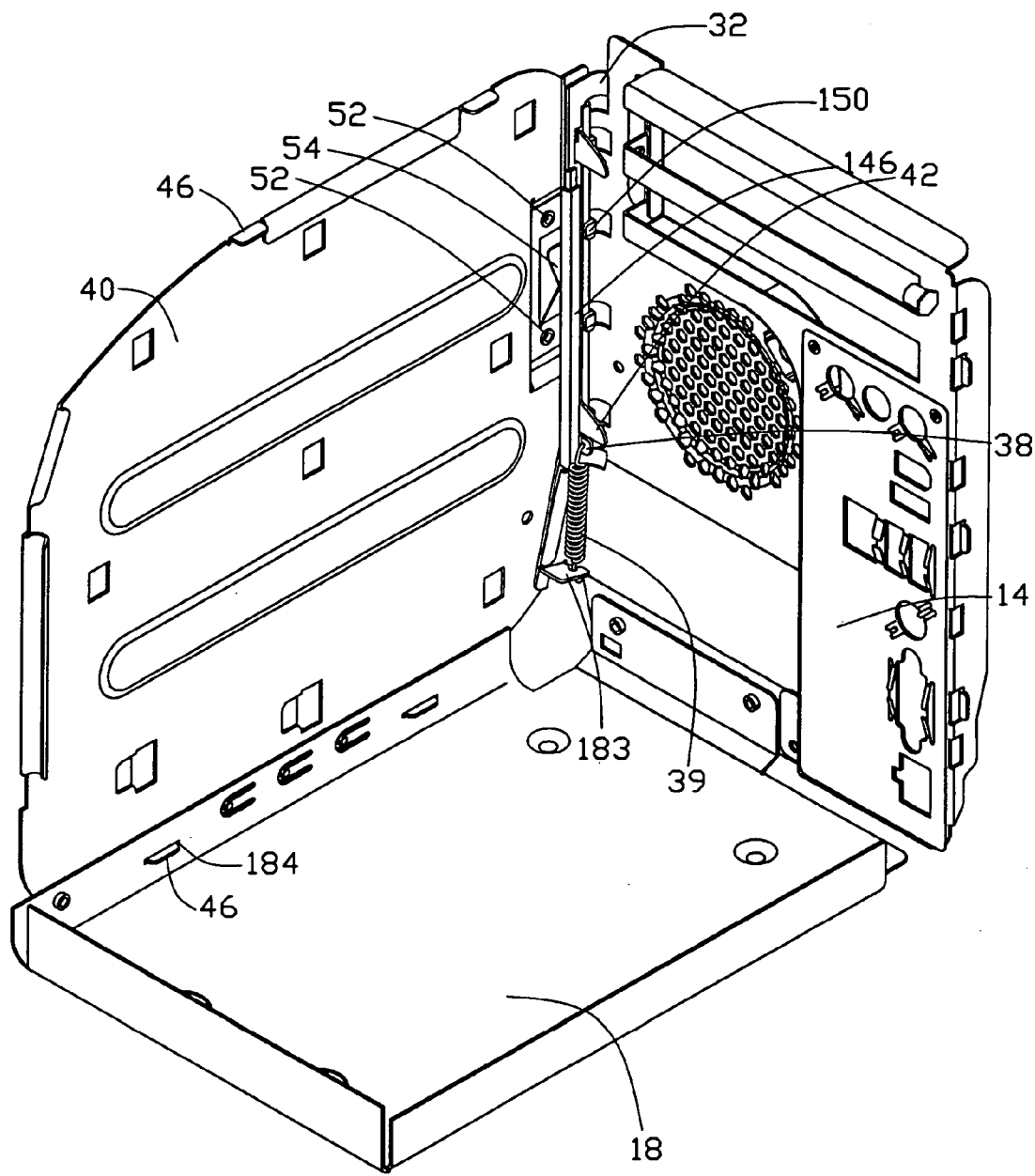
FIG. 4 is an isometric view illustrating the computer with the locking member in an open position.
Figure 5:
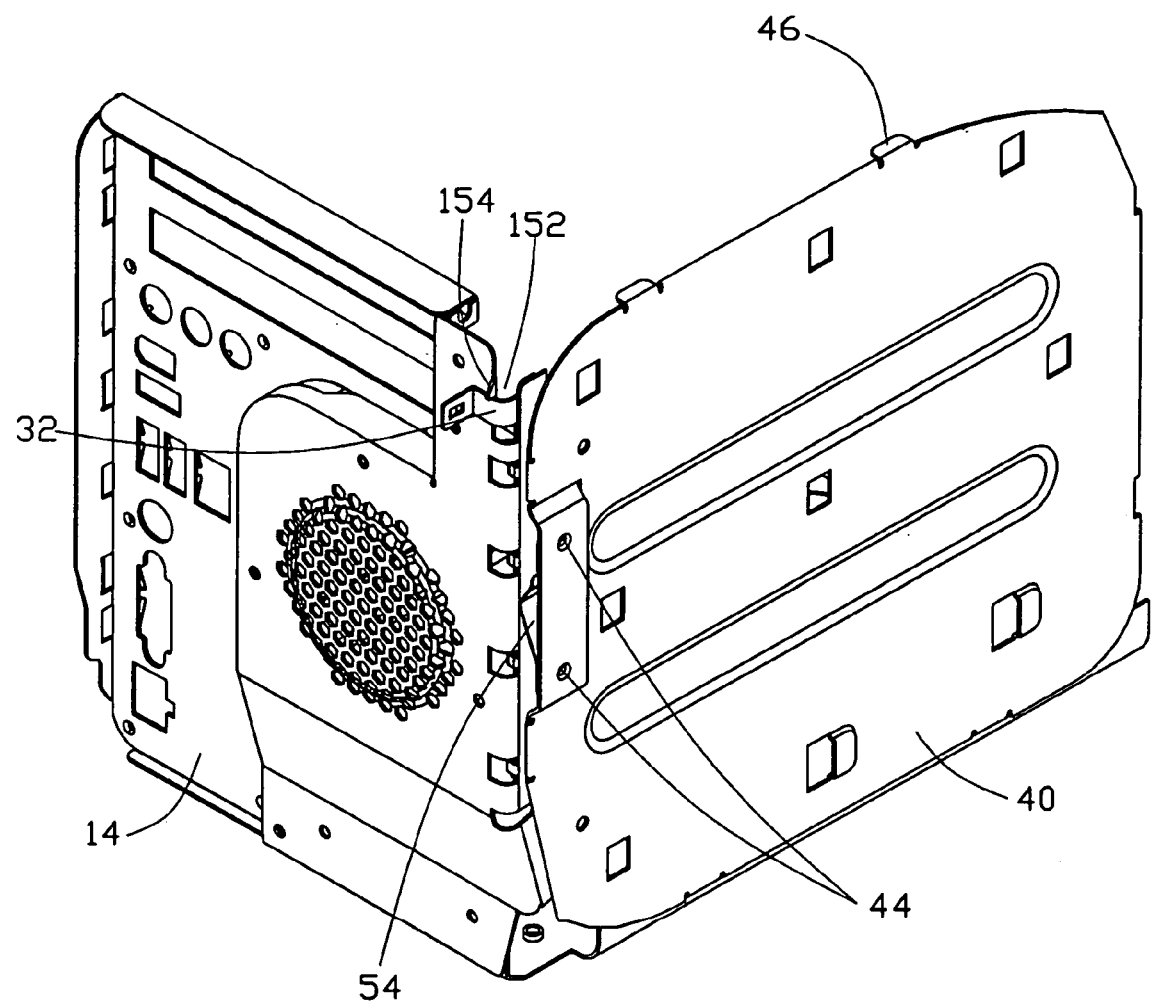
FIG. 5 is an isometric view illustrating the computer with the locking member in an open position but view from another aspect.

Referring to FIGS. 3–5, when assembling the computer enclosure, the strip body 31 of the locking member 30 slides into the sliding space until the locking member 30 reaches the stopper 143. The operation part 32 stays in the opening 152 of the rear panel 14. One end of the spring 39 is connected to the first hook 183 of the second flange 142, the other end is connected to the second hook 38 of the locking member 30, so that the locking member 30 is movably attached on the computer chassis 10. The resilient member 50 is fastened to the side panel 40 via screws (not shown). The rotating portion 48 covers around the first flange 122 of the front panel 12, at the same time, the tabs 46 just align with the first slits 164 and the second slits 184, and the elastic portion 52 is also slightly pressed against the second flange 142. The upper edges of the clasp slots 34 are a little lower than those of the notches 144 of the second flange 142. When the side panel 40 is further pressed on, the elastic portion 52 is deformed by pressure, the clasps 42 cross the notches 144 as well as the clasp slots 34 via the salient portions 421 propping against the upper edge of die clasp slots 34 and drive the locking member 30 sliding upwardly by stretching the spring 39. After the clasps 42 extend through the notches 144 and the clasp slots 34 respectively, the spring 39 draws back and the locking member 30 is also reposited. Then the upper edges of the clasp slots 34 are fastened by the salient portions 421 of the clasps 42, the elastic portion 52 is pressed against tightly the second flange 142, the side panel 40 is fastened on the computer chassis 10.

In disassembling, the operation part 32 is pulled up, the salient 154 of the rear panel 14 prevents the operation part 32 from being overly pulled, the spring 39 is deformed again, the clasp slots 34 and the notches 144 are superposed, then the upper edges of the clasp slots 34 are released from the salient portions 421, so the side panel 40 turns outwardly from the first flange 122 via a restoring force given by the elastic portion 52, the side panel 40 is separated from the computer chassis 10.

It is to be understood, however, that even though numerous characteristics and advantages of the present invention have been set forth in the foregoing description, together with details of the structure and function of the invention, the disclosure is illustrative only, and changes may be made in detail, especially in matters of type, arrangement of components within the principles of the invention to the full extent indicated by general meaning of the terms in which the appended claims are expressed.

We claim:

1. A computer enclosure comprising:
a computer chassis comprising a rear panel, a front panel, a top panel and a bottom panel, two of the panels respectively perpendicularly extending to form two flanges, at least one notch defined in one of the flanges and a pivot part formed on the other one of the flanges opposite to said one of the flanges;
a locking member attached to the computer chassis for movement of the locking member between an open position thereof and a closed position thereof, the locking member comprising at least one clasp slot cooperating with the notch;
a side panel comprising a rotating portion on one side edge of the side panel and at least one clasp on another side edge of the side panel corresponding to the clasp slot and the notch; and
a resilient member mounted on the side panel, the resilient member comprising an elastic portion;
wherein when the locking member is in the closed position, the elastic portion of the resilient member is deformed and sandwiched between the side panel and said one of the flanges of the computer chassis, and when the locking member is in the open position, the rotating portion of the side panel is rotated around the pivot part of the computer chassis via restoring force of the elastic portion; and
wherein the locking member is movably mounted on said one of the flanges via a spring, and a first hook is formed from said one of the flanges for fixing one end of the spring.

2. A computer enclosure comprising:
a computer chassis comprising a rear panel, a front panel, a top panel and a bottom panel, two of the panels respectively perpendicularly extending to form two flanges, at least one notch defined in one of the flanges and a pivot part formed on the other one of the flanges opposite to said one of the flanges;
a locking member attached to the computer chassis for movement of the locking member between an open position thereof and a closed position thereof, the locking member comprising at least one clasp slot cooperating wit the notch;
a side panel comprising a rotating portion on one side edge of the side panel and at least one clasp on another side edge of the side panel corresponding to the clasp slot and the notch; and
a resilient member mounted on the side panel, the resilient member comprising an elastic portion;
wherein when the locking member is in the closed position, the elastic portion of the resilient member is deformed and sandwiched between the side panel and said one of the flanges of the computer chassis, and when the locking member is in the open position, the rotating portion of the side panel is rotated around the pivot part of the computer chassis via restoring force of the elastic portion; and
wherein an opening is defined in a top end of said one of the flanges for exposing an operation part of the locking member and a salient protrudes from one side edge of the opening for restricting the operation part of the locking member.

3. A computer enclosure comprising:
a computer chassis comprising a rear panel, a front panel, a top panel and a bottom panel, two of the panels respectively perpendicularly extending to form two flanges, at least one notch defined in one of the flanges and a pivot part formed on the other one of the flanges opposite to said one of the flanges;
a locking member attached to the computer chassis for movement of the locking member between an open position thereof and a closed position thereof, the locking member comprising at least one clasp slot cooperating with the notch;

a side panel comprising a rotating portion on one side edge of the side panel and at least one clasp on another side edge of the side panel corresponding to the clasp slot and the notch; and a resilient member mounted on the side panel, the resilient member comprising an elastic portion;

wherein when the locking member is in the closed position, the elastic portion of the resilient member is deformed and sandwiched between the side panel and said one of the flanges of the computer chassis, and when the locking member is in the open position, the rotating portion of the side panel is rotated around the pivot part of the computer chassis via restoring force of the elastic portion; and wherein a side edge of said one of the flanges is further bent, a plurality of catches extends inwardly from the rear panel and the locking member is contained in a space defined by said one of the flanges and the catches together.

* * * * *